United States Patent

Sandelis

[19]

[11] Patent Number: 5,941,076
[45] Date of Patent: Aug. 24, 1999

[54] DEFLECTING FEEDER BOWL ASSEMBLY FOR A TURBOJET ENGINE COMBUSTION CHAMBER

[75] Inventor: Denis Sandelis, Nangis, France

[73] Assignee: Snecma-Societe Nationale d'Etude et de Construction de Moteurs d'Aviation, Paris, France

[21] Appl. No.: 08/898,403

[22] Filed: Jul. 22, 1997

[30] Foreign Application Priority Data

Jul. 25, 1996 [FR] France .................................. 96 09363

[51] Int. Cl.⁶ .......................................................... F23R 3/10
[52] U.S. Cl. ................................ 60/752; 60/754; 60/755
[58] Field of Search .............................. 60/737, 740, 748, 60/752, 754, 755

[56] References Cited

U.S. PATENT DOCUMENTS

| 4,726,182 | 2/1988 | Barbier et al. . | |
|---|---|---|---|
| 4,754,600 | 7/1988 | Barbier et al. | 60/737 |
| 4,766,722 | 8/1988 | Bayle-Laboure et al. . | |
| 4,870,818 | 10/1989 | Suliga | 60/737 |
| 5,220,786 | 6/1993 | Campbell . | |
| 5,353,599 | 10/1994 | Johnson et al. s | 60/748 |
| 5,484,263 | 1/1996 | Nagaraj et al. | 415/200 |
| 5,623,827 | 4/1997 | Monty | 60/748 |
| 5,765,376 | 4/1988 | Zarzalis et al. | 60/752 |

FOREIGN PATENT DOCUMENTS

| 0 182 687 | 5/1986 | European Pat. Off. . |
|---|---|---|
| 0 214 003 | 3/1987 | European Pat. Off. . |
| 0 471 438 | 2/1992 | European Pat. Off. . |
| 2 173 891 | 10/1986 | United Kingdom . |

Primary Examiner—Ted Kim
Attorney, Agent, or Firm—Bacon & Thomas, PLLC

[57] ABSTRACT

A combustion chamber is disclosed for a gas turbine engine having a feeder bowl interposed between the forward end wall of the combustion chamber and an associated air and fuel injection device, the feeder bowl having a generally annular configuration with spaced apart outer and inner walls forming a chamber. A baffle is formed integrally with the feeder bowl and extends outwardly from a merging zone in a direction generally parallel to the forward end wall of the combustion chamber. The outer wall of the feeder bowl has a plurality of air intake orifices communicating with the chamber and located adjacent to the merging zone. The inner wall of the feeder bowl has a plurality of first and second air outlet orifices, both communicating with the chamber and the second air outlet orifices being spaced from the first air outlet orifices.

10 Claims, 2 Drawing Sheets

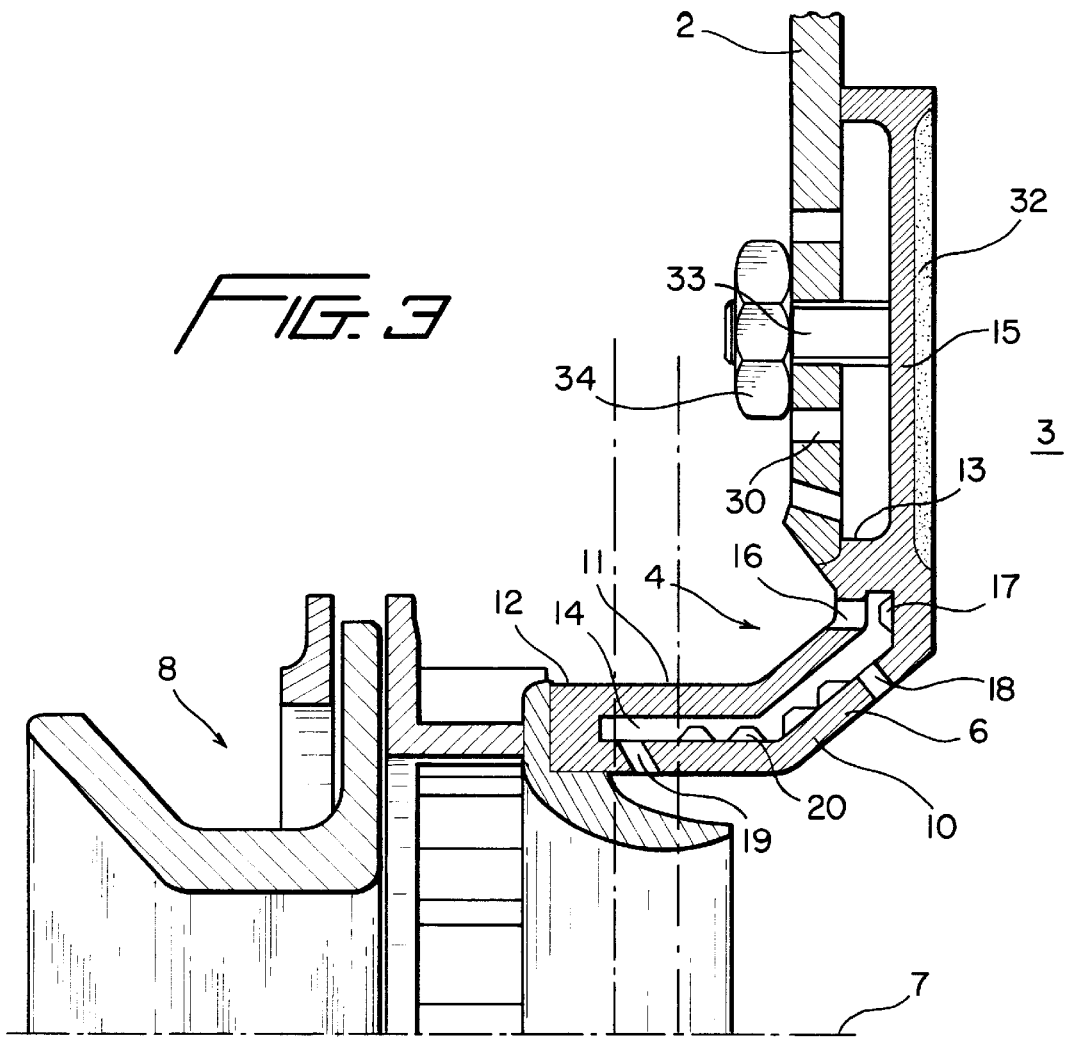
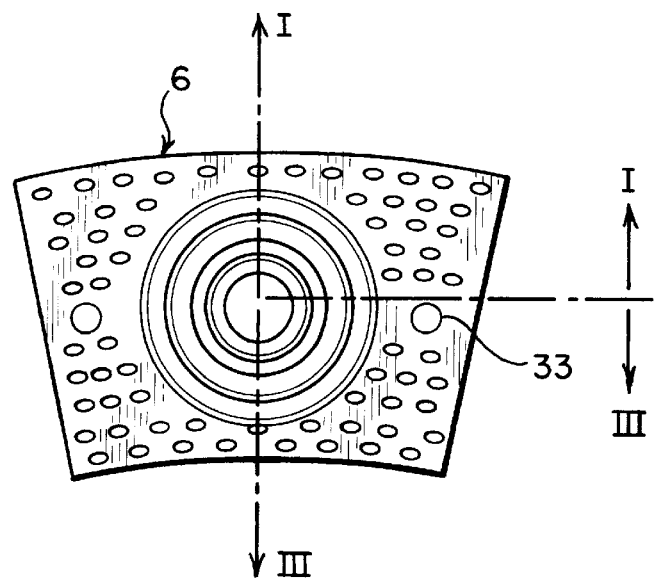

DEFLECTING FEEDER BOWL ASSEMBLY FOR A TURBOJET ENGINE COMBUSTION CHAMBER

BACKGROUND OF THE INVENTION

The present invention relates to combustion chambers for aircraft gas turbine engines, more particularly such combustion chambers having a deflecting feeder bowl assembly.

Gas turbine engines are known in which the annular combustion chamber is bound by inner and outer walls connected by a forward end wall, the forward end wall having openings through which fuel and air are injected into the combustion chamber via an air and fuel injection device. Typically, a feeder bowl structure is interposed between the air and fuel injection device and the forward end wall of the combustion chamber.

In such known combustion chambers, particularly those used in turbojet engines in military aircraft, the feeder bowl structures are subjected to high stresses. In high performance turbojet engines, the air is being injected into the combustion chambers at higher compression ratios, thereby increasing the pressures and temperatures at the intakes of the combustion chambers. The increases in pressure and temperature also relate to an increase in the gas temperatures within the combustion chamber, thereby subjecting the feeder bowls to high thermal and mechanical stresses. Typically, in modern turbojet engines, the feeder bowl structures are subjected to temperatures between 900° and 1,000° C. The feeder bowls are cooled by only approximately 2% of the air flow into the combustion chamber.

Such extreme operating conditions may cause burns and/or deformations in the outer edges of the feeder bowl, thereby deleteriously affecting the cooling film formed on the walls of the combustion chamber by the outer portions of the feeder bowls. The improper formation of the cooling film may result in deformation or complete burning through the wall of the combustion chamber.

SUMMARY OF THE INVENTION

A combustion chamber is disclosed for a gas turbine engine having a feeder bowl interposed between the forward end wall of the combustion chamber and an associated air and fuel injection device, the feeder bowl having a generally annular configuration with spaced apart outer and inner walls forming a chamber. A baffle is formed integrally with the feeder bowl and extends outwardly from a merging zone in a direction generally parallel to the forward end wall of the combustion chamber. The outer wall of the feeder bowl has a plurality of air intake orifices communicating with the chamber and located adjacent to the merging zone. The inner wall of the feeder bowl has a plurality of first and second air outlet orifices, both communicating with the chamber and the second air outlet orifices being spaced from the first air outlet orifices.

Utilizing the feeder bowl assembly according to the present invention will facilitate the cooling of the feeder bowl, as well as the baffle so as to minimize the deleterious effects of the high pressures and temperatures on the feeder bowl structure.

According to the present invention, the feeder bowl and the baffle form a compact assembly rigidly affixed to the forward end of the combustion chamber. The invention also improves the cooling in the zone where the feeder bowl and the baffle are joined since all of the air passing through the plurality of the first air outlet orifices (approximately 6% of the air flow into the combustion chamber) and all of the air passing through the plurality of second air outlet orifices (approximately 4% of the air flow into the combustion chamber) take part in cooling the feeder bowl. This is contrasted with approximately 2% of the air flow entering the conventional combustion chamber cooling the conventional feeder bowl structure.

The present invention also enhances the evaporation of the fuel entering the combustion chamber, since the air emanating from the feeder bowl and coming into contact with the fuel is heated by passing through the feeder bowl structure prior to encountering the fuel.

In order to further enhance the heat transfer to the air passing through the feeder bowl chamber, heat transfer elements extend from the outer and/or the inner wall into the chamber.

The baffle also may comprise a plurality of baffle orifices which have central axes forming an acute angle with the central longitudinal axis of the feeder bowl and direct air radially outwardly with respect to the central longitudinal axis. The baffle has a heat shield on the side facing the interior of the combustion chamber preferably made of yttrium zirconate.

BRIEF DESCRIPTION OF THE DRAWINGS

FIG. 2 is a partial, rear view of the feeder bowl illustrated in FIG. 1 viewed from the interior of the combustion chamber (from the right as viewed in FIG. 1).

FIG. 3 is a partial, cross-sectional view taken along line III—III in FIG. 2.

DETAILED DESCRIPTION OF THE PREFERRED EMBODIMENT

Figure 1:
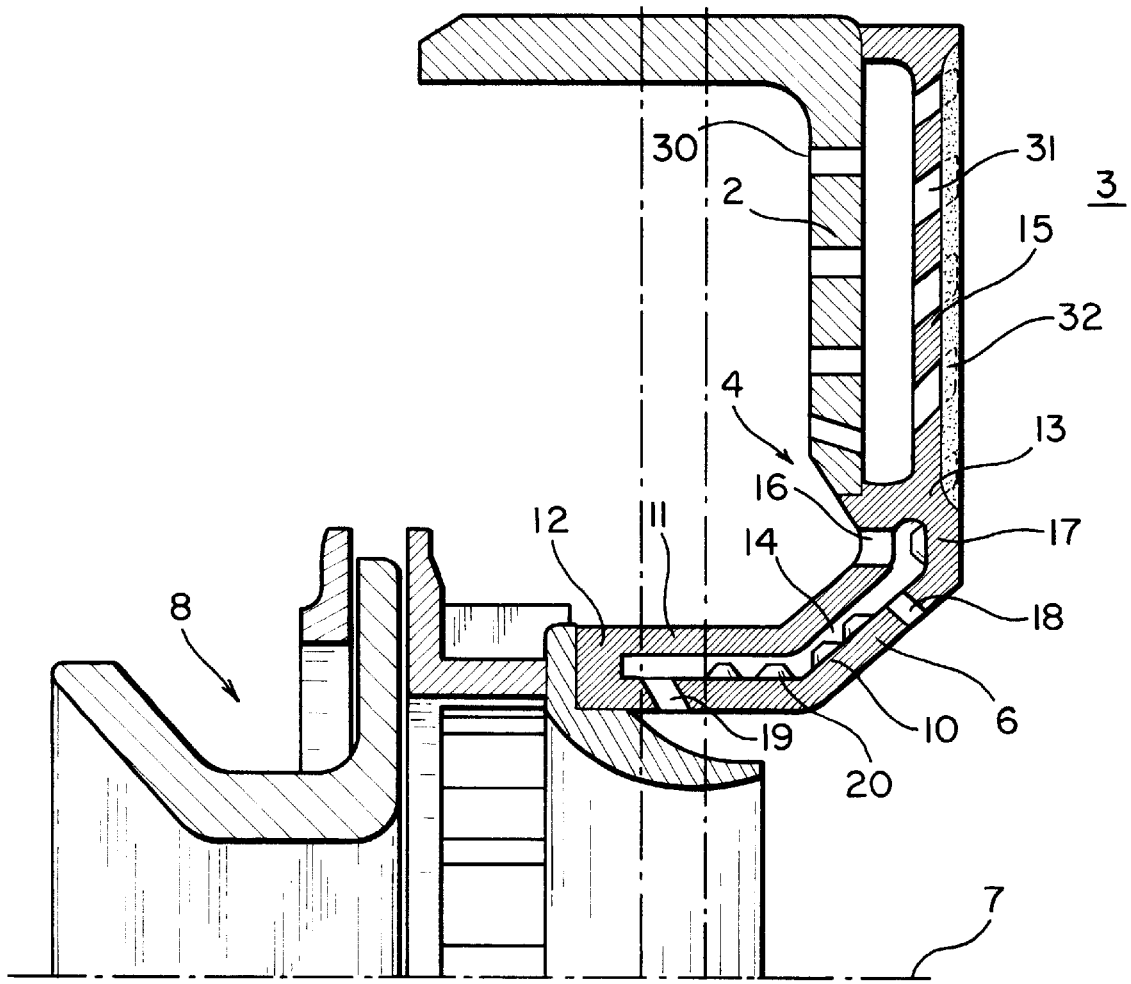
FIG. 1 is a partial, longitudinal cross-sectional view of feeder bowl according to the present invention.

As illustrated in FIGS. 1 and 2, reference numeral 2 denotes the forward end wall of a combustion chamber which, together with inner and outer combustion chamber walls (not shown) form an annular combustion chamber 3 for a gas turbine engine. The forward end wall 2 has a plurality of openings 4 regularly arrayed around an axis of symmetry of the combustion chamber, each opening receiving a generally annular feeder bowl 6, and an air and fuel injection device 8. The feeder bowl 6 has a central longitudinal axis 7.

As can be seen, the feeder bowl 6 flares outwardly from the forward end (towards the left as viewed in FIGS. 1 and 3) towards the rear, in the direction of gas flow and comprises an inner wall 10 and an outer wall 11 connected in spaced apart fashion by a front feeder bowl wall 12 and a rear feeder bowl wall 13 so as to form a chamber 14. The inner wall 10 extends beyond the rear feeder bowl wall 13 and forms an integral deflecting baffle 15 which extends radially outwardly from the central longitudinal axis 7 in a direction generally parallel to the forward end wall 2 of the combustion chamber. As illustrated, the baffle 15 is spaced apart from the forward end wall 2. The feeder bowl 6 and the baffle 15 are formed as an integral structure, such as by casting or the like, thereby decreasing the manufacturing costs for this structure.

As clearly illustrated in FIGS. 1 and 3, the outer wall 11 comprises a plurality of air intake orifices 16 located adjacent to a merging zone 17 wherein the feeder bowl 6 merges with the baffle 15. The air intake orifices 16 enable cooling air to pass into the chamber 14, this cooling air impacting on the merging zone 17. The cooling air exits the chamber 14 through a plurality of first air outlet orifices 18 formed in the inner wall 10 near the merging zone 17 and through a plurality of second air outlet orifices 19 formed in the inner wall 10 adjacent to the forward feeder bowl wall 12.

Using the structure according to the present invention, approximately 10% of the total air feeding the combustion chamber enters through the air intake orifices 16 and takes part in cooling the feeder bowl structure. Approximately 60% of the cooling air passing into the chamber 14 exits through the first air outlet orifices 18 and is subsequently injected into the fuel cone from the air and fuel injection device 8. The remaining (approximately 40%) of the air passing into the chamber 14 exits through the second air outlet orifices 19. Since this air has passed through substantially the entire length of the feeder bowl 6, it is heated due to the heat transfer and actually takes part in atomizing the fuel emanating from the air and fuel injection device 8. In order to enhance the cooling of the feeder bowl 6, inner wall 10 and outer wall 11 may have a plurality of heat transfer elements 20 extending therefrom into the chamber 14. Such heat transfer elements increase the contact area between the air passing through the chamber 14 and the feeder bowl, thereby enhancing the heat transfer. Heat transfer elements 20 may assume any known configuration, depending upon the desired characteristics of each individual application.

The forward end wall 2 of the combustion chamber has a plurality of apertures 30 therethrough, the apertures 30 extending substantially parallel to the central longitudinal axis 7. Air passing through these apertures 30 impact cools the baffle 15. Baffle 15 has a plurality of baffle orifices 31 arrayed in a staggered relationship relative to the apertures 30. The baffle orifices have central axes that extend obliquely with respect to the central longitudinal axis 7 and form an angle therewith of approximately 70 degrees. The baffle orifices direct the air passing though them radially outwardly with respect to the central longitudinal axis 7. Such direction of the air enables the cooling film to be developed, in known fashion, along the inner and outer walls (not shown) bounding the combustion chamber.

Baffle 15 has a side that faces the interior of the combustion chamber and which is clad with a heat shield 32, preferably formed of yttrium zirconate. Baffle 15 is rigidly attached to the forward end wall 2 by means of bolts 33, which may be formed integrally with the baffle 15, and nuts 34.

The foregoing description is provided for illustrative purposes only and should note be construed as in any way limiting this invention, the scope of which is defined solely by the appended claims.

I claim:

1. A combustion chamber for a gas turbine engine wherein the combustion chamber has a forward end wall with at least one opening, and an air and fuel injection device having an outer wall located so as to inject air and fuel into the combustion chamber through the at least one opening, the combustion chamber comprising:

a) a feeder bowl having a generally annular configuration and located between the forward end wall and the air and fuel injection device, the feeder bowl engaging and surrounding at least a portion of the fuel injection device outer wall, the feeder bowl having an outer wall and an inner wall spaced apart by front and rear feeder bowl walls so as to form a chamber therebetween;

b) a baffle formed integrally with the feeder bowl external of the chamber and extending from a merging zone generally parallel to the forward end wall;

c) a plurality of air intake orifices in the outer wall of the feeder bowl communicating with the chamber and located adjacent to the merging zone;

d) a plurality of first air outlet orifices in the inner wall of the feeder bowl adjacent the merging zone communicating with the chamber; and, e) a plurality of second air outlet orifices in the inner wall of the feeder bowl adjacent the front feeder bowl wall communicating with the chamber and axially spaced from the plurality of first air outlet orifices.

2. The combustion chamber of claim 1 further comprising a plurality of heat transfer vanes extending into the chamber from at least one of the inner and outer walls of the feeder bowl.

3. The combustion chamber of claim 2 wherein the heat transfer vanes extend into the chamber from the inner wall of the feeder bowl.

4. The combustion chamber of claim 1 further comprising a plurality of baffle orifices in the baffle.

5. The combustion chamber of claim 4 wherein the feeder bowl has a central longitudinal axis and wherein each baffle orifice has a central axis extending radially outwardly at an oblique angle with respect to the central longitudinal axis.

6. The combustion chamber of claim 5 wherein the central axes of the baffle orifices form angles of approximately 70° with the central longitudinal axis.

7. The combustion chamber of claim 4 further comprising a plurality of apertures through the forward end wall in staggered relationship to the plurality of baffle orifices such that air passing through the plurality of apertures impact cools the baffle.

8. The combustion chamber of claim 1 wherein the baffle has a side facing an interior of the combustion chamber and further comprising a heat shield attached to the side of the baffle facing the interior of the combustion chamber.

9. The combustion chamber of claim 8 wherein the heat shield is made from yttrium zirconate.

10. The combustion chamber of claim 1 further comprising at least one connecting device connecting the baffle to the forward end wall.

* * * * *